United States Patent [19]

Reising et al.

[11] Patent Number: 4,877,837

[45] Date of Patent: Oct. 31, 1989

[54] EPOXY FUNCTIONAL AND SILICONE THERMOSETTING POWDER COATINGS

[75] Inventors: John C. Reising, Avon, Ohio; David E. Miles, Port Huron, Mich.

[73] Assignee: The Glidden Company, Cleveland, Ohio

[21] Appl. No.: 254,617

[22] Filed: Oct. 7, 1988

[51] Int. Cl.[4] ............................................. C08F 8/00
[52] U.S. Cl. ..................................... 525/100; 528/26; 524/14; 524/431; 524/432; 524/439; 524/440; 524/445; 524/451
[58] Field of Search ........................... 525/100; 528/26

[56] References Cited

U.S. PATENT DOCUMENTS

| | | |
|---|---|---|
| 3,644,566 | 2/1972 | Kincheloe et al. ................ 525/100 |
| 3,650,813 | 3/1972 | Nordstrom et al. ................ 525/100 |
| 3,912,670 | 10/1975 | Huemmer et al. ................ 525/502 |
| 4,107,148 | 8/1978 | Fujiyoshi et al. ................ 525/440 |
| 4,446,259 | 5/1984 | Vasta .................................. 524/506 |
| 4,472,484 | 9/1984 | Vasta .................................. 428/461 |

*Primary Examiner*—Melvyn I. Marquis
*Attorney, Agent, or Firm*—Thomas M. Schmitz

[57] ABSTRACT

Thermosetting powder coatings are based on a blend of coreactive polymers comprising a glycidyl acrylic polymer adapted to be crosslinked by a solid cyclic silicone resin having functional hydroxyl and/or methylol groups for coreacting with the glycidyl functionality on the acrylic polymer.

6 Claims, No Drawings

EPOXY FUNCTIONAL AND SILICONE THERMOSETTING POWDER COATINGS

BACKGROUND OF THE INVENTION

This invention pertains to thermosetting powder paints and particularly to thermosetting polymeric binders comprising glycidyl functional acrylic polymers adapted to crosslink with silanol or methylol functional solid cyclic silicone resin useful as binder in powder paints.

Acrylic resins useful in powder coatings are known to exhibit good weathering properties if the acrylic copolymer does not contain major amounts of copolymerized styrene. U.S. Pat. No. 4,446,259 and U.S. Pat. No. 4,472,484 disclose blends of acrylic binder and silicone resin. Acrylic copolymers of silicone resin should provide considerably improved weathering properties and should offset other film property deficiencies of silicone resins. However, attempting to co-react acrylic copolymer with silicone resins is difficult to achieve in practice since the reaction is difficult to control and often results in useless crosslinked polymers known as gels. The reaction is difficult to control due to hydroxyl groups on the acrylic polymer as well as the silanol groups on the silicone polymer. For instance, a hydroxylated acrylic copolymer prepared in solvent and subsequently reacted with silanol or alkyl ether groups in silicone resin either gelled upon coreaction or gelled during the process of stripping solvent off the resulting product. Efforts to blend hydroxyl functional silicones with a wide variety of polymers including acrylic polymers resulted in paint films with greatly reduced mechanical properties with little or no improvement in exterior weathering.

It now has been found that a glycidyl functional acrylic polymer blended with silanol or methylol functional solid cyclic silicone provides an excellent thermosetting polymeric binder useful in powder coating to produce cured paint films exhibiting superior exterior weathering properties. Using the solid cyclic silicone as crosslinker avoids the need for undesirable isocyanate or diacid crosslinkers and further overcomes the inherent deficiencies associated with conventional liquid silicones. The polymeric blends of this invention advantageously can be formulated into powder paints to provide a low or variable gloss appearance to durable exterior powder coatings. Substantially improved chalk resistance and exterior weathering properties are obtained from the blended polymers along with other improved film integrity properties. The polymeric blend can be combined with other additives to produce clear or pigmented powder coatings. These and other advantages of this invention will become more apparent by referring to the detailed description of the invention and the illustrative examples.

SUMMARY OF THE INVENTION

Briefly, thermosettng powder coatings comprise a thermosetting polymeric binder comprising a matrix polymer of a glycidyl acrylic polymer adapted to be crosslinked with a silanol or methylol functional cyclic silicone. On a weight basis, the polymeric binder comprises between 10% and 70% functional cyclic silicone to coreact with the functional matrix polymer.

DETAILED DESCRIPTION OF THE INVENTION

Referring to the glycidyl functional acrylic polymer, the acrylic polymer is produced by copolymerization of ethylenically unsaturated monomers including acrylic and glycidyl functional monomers. Ethylenic monomers contain carbon-to-carbon unsaturation and include vinyl monomers, acrylic monomers, allylic monomers, acrylamide monomers, and mono- and dicarboxylic unsaturated acids. Vinyl monomers include vinyl esters, vinyl acetate, vinyl propionate, vinyl butyrates, vinyl benzoates, vinyl isopropyl acetates and similar vinyl esters; vinyl halides such as vinyl chloride, vinyl fluoride, and vinylidene chloride; vinyl aromatic hydrocarbons such as styrene, methyl styrenes and similar lower alkyl styrenes, chlorostyrene, vinyl toluene, vinyl naphthalenes, divinyl benzoate, and cyclohexene; vinyl aliphatic hydrocarbon monomers such as alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers such as methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylate, as well as amino acrylates and methacrylates. Acrylic acids include acrylic and methacrylic acid, ethacrylic acid, alpha-chloroacrylic acid, alpha-cycanoacrylic acid, crotonic acid, and beta-acryloxy propionic acid. Other useful ethylenic monomers can include N-alkylol amides such as acrylamides or methacrylamides including N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups. Hydroxyl monomers can include hydroxy alkyl acrylates such as 2-hydroxy ethyl acrylate and methacrylate, 2-hydroxy propyl acrylate and methacrylate, and similar lower alkyl 2-hydroxy acrylates. Oxirane monomers characteristically contain oxirane functionality

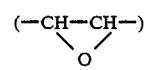

as well as pendant ethylenic double bond unsaturation and include for exammple acrylic, methacrylic, or vinyl derivatives of glycidyl. Preferred oxirane monomers contain pendant oxirane and include glycidyl acrylate, glycidyl methacrylate, and allyl glycidyl ether. The oxirane monomers can be copolymerized with ethylenically unsaturated monomers.

In accordance with this invention, the glycidyl functional acrylic polymers comprise copolymerized monomers on a weight basis between 45% and 55% acrylic monomer, between 20% and 30% glycidyl functional monomer, with the balance being other ethylenically unsaturated monomer. The glycidyl acrylic polymers are solid resins at ambient temperature with a Tg above about 40° C., typically above about 55° C., and tack temperature above about 70° C. and typically above about 80° C. The number average molecular weight as measured by GPC is between 2,500 and 3,000 and preferably between 2,600 and 2,800.

The glycidyl functional acrylic polymers can be produced in a fusion or solvent polymerization process of the ethylenic monomers where the solvent if any is subsequently stripped from the finished polymer. Generally, the polymerization is conducted at a temperature of about 20°-100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide, azo compounds such as azodiisobutyronitrile and dimethylazodiisobutyrate; and the like. The amount of initiator typically is between about 0.1 and 3% based on the weight of the copolymerized monomer.

Referring now to the silicone resins useful in this invention, the silicone resins are solid, non-liquid silicone resins at ambient temperature and are primarily based on cyclic silicone molecules. Silicone resins are based on a chemical backbone structure comprising alternative silicon and oxygen atoms, where methyl groups primarily or other lower alkyl groups or phenyl groups are attached to the silicon atoms, provided that hydroxyl groups or methylol groups are available and attached to silicon atoms for crosslinking purposes. Silicone resins are prepared from organochlorosilanes such as methyltrichlorosilane, phenyltrichlorosilane, and dimethyldichlorosilane, which can be coreacted with an organic halide such as methyl chloride or chlorobenzene in the presence of silicon and copper catalyst to produce chlorosilanes which can be further reacted with water to form hydroxysilanes and dehydrolysis to eventually organopolysiloxanes (silicones). In accordance with this invention, useful silicones comprise cyclic organopolysiloxanes being solids resin at ambient temperatures and having a Tg above about 400° C. and a tack temperature above about 70° C. Particularly preferred cyclic silicones are hydroxy functional cyclic silicones with two or more hydroxyl groups per cyclic silicone molecule unit where the silicone resin has a number average molecular weight above 600 and preferably between 1500 and 8000 as measured by GPC. A preferred cyclic silicone is a cyclic silanol having at least two SiOH groups per molecule and where some of the non-hydroxy valence bonds of the silanol contribute to the cyclic structure. Preferred cyclic silicone resins include those disclosed in U.S. Pat. No. 3,912,670 and U.S. Pat. No. 4,107,148, and both said patents are incorporated herein by reference. The most preferred hydroxy functional silicone resin comprises a hydroxy functional low molecular weight cyclic silicone intermediate (Z-6018, Dow Corning) having a number average molecular weight of about 600 and the theoretical formula:

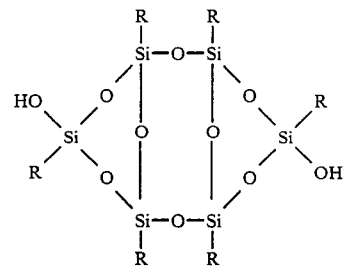

where R is independently a lower alkyl or phenyl group and particularly methyl, ethyl, or phenyl groups. Physical properties of Z-6018 are as follows:

| | |
|---|---|
| Appearance | Flaked solid |
| Theoretical Silicone Content, wt. percent | 96.6 |
| Nonvolatile Content, percent | 98.0 |
| Volatility, 1.5 gms for 3 hrs. at 482° F. (250° C.), percent | 4.5 |
| Hydroxyl Content | |
| weight percent | 6.4 |
| hydroxy no. | 211 |
| weight percent free | 0.5 |
| Specific Gravity at 77° F. (25° C.) | 1.23 |
| Durran Melting Point, degrees | 185° F. (85° C.) |

The preferred siloxane is Z-6018 and self-condensation products thereof. Such condensation products may contain up to twelve units of the above-identified siloxane and have molecular weights between about 2,500 and 3,500 and have the following oligomeric structures of repeating units of cyclic siloxane:

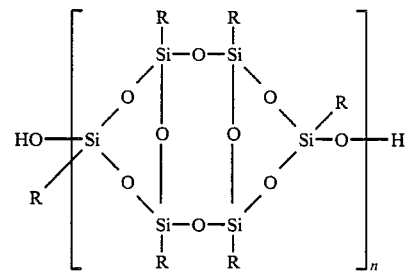

where n is between 1 and 12 and the oligomer can have a number average weight between 600 and 8000 provided the resulting silicone resin has a Tg or softening point above about 40° C. and a tack temperature above about 70° C.

Solid particles of glycidyl functional acrylic matrix polymer or epoxy resin matrix polymer and the cyclic silicone resin crosslinking component can be dry blended together on a weight basis comprising between 40% and 70% glycidyl acrylic resin and between 30% and 60% cyclic silicone resin to provide the organic polymeric binder component of the powder paint of this invention. The binder blend or individual dry components thereof can be thoroughly and uniformly mixed with raw batch ingredients by homogenizing the binder, pigmentary solids, plasticizers and other components to uniformly blend the resinous binder with the pigmentary solids. Pigments can ordinarily include opacifying pigments such as titanium dioxide, zinc oxice, leaded zinc oxide, titanium calcium, as well as tinting pigment such as carbon black, yellow oxides, brown oxides, tan oxides, raw and burnt sienna or umber, chromium oxide green, phthalocyanine green, phthalonirile blue, ultramarine blue, cadmium pigments, chromium pigments, and the like. Filler pigments such as clay, silica, talc, mica, woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter discharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrate and moderately heated between temperatures of about 180° C. and 200° C. to obtain desirable flow out.

The merits of this invention are further illustrated by the following illustrative examples where pecentages are weight percent and temperatures are °C., unless otherwise indicated.

EXAMPLE 1

Acrylic Copolymer

A glycidyl functional acrylic copolymer was produced by copolymerizing the following unsaturated monomers in MEK solvent.

| Monomer | Wt. Parts |
|---|---|
| Methyl Methacrylate | 24 |
| Butyl Methacrylate | 25 |
| Glycidyl methacrylate | 26 |
| Styrene | 25 |

The resulting polymer, stripped of solvent, had a number average molecular weight of 2,700, a Tg of 40° C. and a tack temperature of 77° C.

EXAMPLE 2

Solid Cyclic Silicone Descriptions

| | −2a Dow Z6018 | −2b Dow 6-2230 | −2c Dow 4-3136 |
|---|---|---|---|
| Methyl Hydrogen Polysiloxane | 40–60% | 40–60% | 40–60% |
| Methyl Phenyl Polysiloxane | 40–60% | 40–60% | 40–60% |
| Non Volatile Content | >98% | >98% | >98% |
| Softening Point °C. | 60 | 60 | 80 |
| Tack Temperature °C. | 69 | 66 | 63 |
| Hydroxyl Content | 6.4% | 6.0% | 2.0% |
| Acid Value | 37.8 | 20.9 | 17.5 |
| Specific Gravity 1.23 | 1.26 | 1.08 | |

EXAMPLE 3

Acrylic Silicone Formulations

| | 3a Wt. Parts | 3B Wt. Parts | 3c Wt. Parts | 3d Wt. Parts |
|---|---|---|---|---|
| Acrylic Copolymer Ex. 1 | 52 | 37 | 37 | 25 |
| Mitsui Toatsu - PD7610 Dodecanedoic Acid ($C_{12}$ diacid) DuPont - DDA | 10 | — | — | — |
| Silicone - Dow Z6018 Ex. 2a | — | 25 | — | — |
| Silicone - Dow 6-2230 Ex. 2b | — | — | 25 | — |
| Silicone - Dow 4-3136 Ex. 2c | — | — | — | 37 |
| SBC Chemical Resiflow PL200 Flow Agent* | 0.6 | 0.6 | 0.6 | 0.6 |
| Benzoin - Outgas Agent | 0.4 | 0.4 | 0.4 | 0.4 |
| $TiO_2$ White Pigment | 37 | 37 | 37 | 37 |

*Resiflow PL200 composition: Copolymer of 2 hexyl ethyl acrylate and butyl acrylate.

EXAMPLE 4

Powder Processing Procedure

A. Weigh up - All ingredients in Example 3 weighed to plus or minus 0.1 gram.
B. Premix Blending - Welex High Intensity Laboratory Mixer Model 20M; Mixing time 1 to 2 minutes at 180 RPM.
C. Meltmix Extrusion - Buss Extruder/Kneader Model #PR-46

| | | | |
|---|---|---|---|
| Barrel Temp | 110° C. | Feeder Setting | 6-8 |
| Screw Temp. | 32° C. | Extruder Load | 4-5 Amps |
| Die Temp | 32° C. | Extruder Output | 30-40 Kg/Hr. |
| Screw Speed | 100 rpm | Post-Die Processing | Chill Rolls |

D. Grinding - Micro Pulverizer Type CF; 0.1 Oval Screen 14,000 rpm; Liquid Nitrogen.
E. Sieving - AZO Rotary Sieve Cyclone Screener Model E240-B1; −140 Mesh Screen.

EXAMPLE 5

The following is a summary of the current weatherometer and QUV accelerated exposure data of the powder coatings based on binder combinations of the glycidyl acrylic copolymer in white formulations cured with:

1. Dodecanedioic diacid as a control standard.
2. (3) different solid cystic silicone polymers.

| Exposure Text | WOM (ASTM G23) | | QUV (ASTM D4329) | | |
|---|---|---|---|---|---|
| Hours Exposed | 2000 | 2400 | 1200 | 1600 | |
| Gloss Retained | % 60° | % 60° | % 60° | % 60° | Chalk/ASTM D659 |
| Example 3a - PD7610/DDA | 55 | 30 | 76 | 38 | 2 |
| Example 3b - PD7610/Dow Z6018 | 39 | 30 | 78 | 48 | 8 |
| Example 3c - PD7610/Dow 6-2230 | 63 | 39 | 78 | 50 | 8 |

-continued

| | 1. Dodecanedioic diacid as a control standard. | | | | |
| | 2. (3) different solid cystic silicone polymers. | | | | |
| Exposure Text | WOM (ASTM G23) | | QUV (ASTM D4329) | | |
| Hours Exposed | 2000 | 2400 | 1200 | | 1600 |
| Gloss Retained | % 60° | % 60° | % 60° | % 60° | Chalk/ASTM D659 |
| Example 3d - PD7610/Dow 4-3136 | 74 | 54 | 82 | 76 | 8 |

In addition to improved gloss retention, chalk resistance in QUV exposure tests was greatly improved with the silicone curing agents. Chalk scale: ASTM D659-1 through 10, #10 no chalk, #1 severe chalk.

We claim:

1. A thermosetting powder paint composition comprising on a weight basis:
   between 40% and 70% glycidyl functional acrylic polymer blended with 30% to 60% solid cyclic silicone resin;
   where said glycidyl acrylic polymer comprises copolymerized ethylenically unsaturated monomers of about 45% to 55% acrylic monomer, about 20% to 30% glycidyl functional monomer, with the balance being other ethylenically unsaturated monomer, said glycidyl acrylic polymer having a Tg above about 40° C. and a number average weight between about 2,500 and 3,000 as measured by GPC;
   where the cyclic silicone resin has a Tg above about 50° C. and a molecular weight above about 600 where the cyclic silicone resin includes a cyclic silicone molecule having at least two hydroxyl groups and/or methylol groups per cyclic silicone molecule, and said cyclic silicone resin crosslinks with said glycidyl acrylic polymer upon heating to provide a thermosetting powder coating.

2. The powder paint composition in claim 1 where the solid cyclic silicone resin has the theoretical structure:

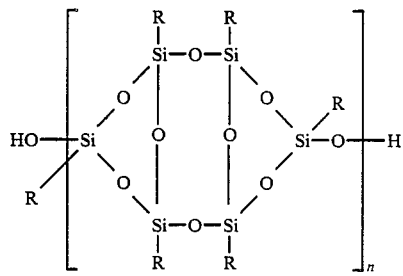

where n is between 1 and 12 and the silicone resin has a number average weight between about 600 and 8000.

3. The powder paint composition in claim 2 where n is 1 and the molecular weight of the silicone resin is approximately 600.

4. The powder paint composition in claim 2 where the molecular weight of the silicone resin is between about 2,500 and 3,500.

5. The powder paint in claim 1 where the solid silicone resin contains a cyclic silicone molecule having two or more hydroxyl groups per cyclic silicone molecule.

6. The powder paint in claim 1 where the solid silicone resin contains a cyclic silicone molecule having at least two hydroxyl groups per cyclic silicone molecule.

* * * * *